Patented Mar. 11, 1930

1,750,420

UNITED STATES PATENT OFFICE

FRANCIS B. MUHLENBERG, OF UPPER DARBY, PENNSYLVANIA

TREATMENT OF PETROLEUM PRODUCTS

No Drawing.   Application filed December 15, 1925.   Serial No. 75,618.

This invention relates to treatment of petroleum products and more particularly to a method of removing odor and color from gasoline, kerosene, head oil, and similar petroleum products.

Such products contain impurities consisting principally of sulfur which impart to them a very offensive odor.

I have found that these impurities may be substantially entirely removed by treating the product with a solution or suspension of a hydroxide of a heavy metal. The hydroxide solution is passed through the body of oil and when it separates from the oil, the impurities settle to the bottom with the solution and the oil free of color and odor, may be removed from the top of the container.

In practicing the process, I prefer to use an ammoniacal solution of copper hydroxide. This solution is then sprayed over the body of oil to be treated which is arranged in a suitable container and it passes through the oil in a plurality of fine streams and during its passage through the oil, the solution removes the sulfur and other impurities from the oil and they accumulate in the bottom of the tank or container. As the solution is sprayed into the oil, it passes to the bottom whence it may be removed by a pump or other suitable apparatus and again returned to the top of the oil. This process is repeated until substantially all of the impurities are removed and a substantially colorless and odorless product is obtained. In some instances, the oil after being removed from the container may be filtered through fuller's earth. It will be apparent from the foregoing description that my process is preferably carried out under atmospheric conditions and that a certain measure of agitation of the material being treated is effected by the action of the spray on the surface of the material being treated and by the circulation set up by the pump in returning the treating solution from the bottom of the treating apparatus to the top thereof.

As stated, various hydroxides of heavy metals may be employed in place of copper hydroxide. Some of these metals are insoluble in a solution of ammonia, such for instance as hydroxide of iron. I have found, however, that the gelatinous suspension formed when oxide of iron is treated with an excess of an ammonium solution may be employed in substantially the same manner as the solution of copper hydroxide.

In operation, any suitable mechanical means may be employed for obtaining the necessary contact between the solution and the oil or petroleum product to be treated. As stated, I have found that the use of a sprinkler head arranged over the tank or container by means of which the solution may be sprayed into the body of oil in a number of fine streams is advantageous. The streams of the solution then pass downwardly through the oil, removing the impurities which settle in the bottom of the tank or container and the oil and solution form in two layers with the solution at the bottom. The solution may be withdrawn either continuously in regulated amounts, or periodically by any suitable means and returned to the sprinkler head at the top of the tank and this operation may be repeated continuously until the oil by test has been sufficiently purified and the color and odor removed.

While I have described in detail the preferred practice of my process, it is to be understood that the details of procedure may be widely varied without departing from the spirit of the invention or the scope of the subjoined claims.

I claim:

1. The herein described process of treating petroleum products containing sulfur impurities to remove such impurities therefrom which comprises spraying an ammoniacal solution of copper hydroxide into the body of the petroleum product being treated, said solution and said body being at substantially ordinary atmospheric temperature, removing the solution from the bottom after it has passed through the petroleum product, returning the solution to the top of the body of the petroleum product and subsequently separating the purified oil from the top of the solution.

2. The herein described process of treating petroleum products containing sulfur impurities to remove such impurities therefrom which comprises spraying into such products copper hydroxide in the presence of an excess of ammonium hydroxide, the copper hydroxid, ammonium hydroxid, and the petroleum products being at substantially ordinary atmospheric temperature and separating the purified oil from the treating solution.

3. The process of purifying oils which comprises treating the oil under substantial atmospheric temperature conditions with a compound formed by the reaction of cupric hydroxide and ammonia.

4. The process of desulphurizing hydrocarbons comprising treating the hydrocarbons under normal atmospheric conditions with a solution of a compound formed by the reaction of cupric hydroxide and ammonia, and agitating the mass.

5. The process of desulphurizing hydrocarbons which comprises treating the hydrocarbons under substantial atmospheric conditions with a solution of a compound formed by the reaction of cupric hydroxide and ammonia.

In testimony whereof, I affix my signature.

FRANCIS B. MUHLENBERG.